Sept. 12, 1972  R. A. CROSS  3,691,068
DIALYSIS MEMBRANE AND ITS USE
Filed Jan. 8, 1971  2 Sheets-Sheet 1

3,691,068
DIALYSIS MEMBRANE AND ITS USE
Robert A. Cross, Harvard, Mass., assignor to Amicon
Corporation, Lexington, Mass.
Filed Jan. 8, 1971, Ser. No. 104,916
Int. Cl. B01d 13/00
U.S. Cl. 210—22                                              20 Claims

ABSTRACT OF THE DISCLOSURE

Subjecting a dialyzable liquid (such as blood) to dialysis (hemodialysis) by providing an anisotorpic microporous polysulfone polymer membrane having a barrier layer at a surface theerof and a more porous support layer integral with the barrier layer, the barrier and support layers being a continuous uninterrupted polymer phase, which membrane has a dialytic resistance to sodium chloride less than about 50 min./cm. and a total ultrafiltration flux between about $3 \times 10^{-5}$ and $1 \times 10^{-6}$ ml./(cm.$^2$ x min. x mm.$_{Hg}$), contacting the barrier layer surface of this membrane with the dialyzable liquid, and contacting the other side of the membrane with a solvent for the dialyzable components of such liquid.

---

This invention relates to dialysis, and particularly to hemodialysis.

The stringent requirements for hemodialysis membranes have severely restricted the number of available useful membrane materials. Hemodialysis, which is the dialysis of blood, is used generally to carry out one ro more kidney functions, in persons with malfunctioning kidneys, such as to remove undesired microsolutes from blood, to maintain a proper salt balance and to remove small amounts of water. Heretofore only cellophane has been found to possess both sufficient strength for repeated use and the required flow requirements—a low dialytic resistance to salt, high dialytic resistance to larger molecules (proteins and the like), and a low water flux. However, cellophane also has its disadvantages, not the least of which is that the cellophane membrane cannot be dried without loss in properties (and hence must be shipped, e.g., plasticized with glycerine which must later be removed before using the membrane) and also cannot be conventionally sterilized in an autoclave.

The object of this invention is to provide a novel and improved dialysis apparatus, particularly well suited for hemodialysis, which includes a membrane which not only possesses suitable strength and flow characteristics, but is also driable and sterilizable.

Other objects are to provide novel and improved hemodialysis apparatus and processes.

The invention features subjecting a dialyzable liquid to dialysis by providing an anisotropic microporous polysulfone polymer membrane having a barrierlayer at a surface thereof and a more porous support layer integral with the barrier layer, the barrier and support layers being a continuous uninterrupted polymer phase, which membrane has a dialytic resistance to soduim chloride less than about 50 min./cm. and a total ultrafiltration flux between about $3 \times 10^{-5}$ and $1 \times 10^{-6}$ ml./cm.$^2$ x min. x mm. $_{Hg}$), contacting the barrier layer surface of this membrane with the dialyzable liquid, and contacting the other side of the membrane with a solvent for the dialyzable components of such liquid.

The membrane may be formed by forming a solution comprising the polysulfone polymer dissolved in an organic solvent, forming a barrier layer on one side of a thin film formed of this solution by preferentially contacting that side of the film with a diluent characterized by a high degree of compatibility with the organic solvent and a sufficiently low degree of compatibility with the polymer to effect precipitation of the polymer immediately on contact of polymer and diluent, maintaining the diluent in contact with the film until substantially all of the organic solvent has been replaced with diluent, drying the film until at least about 90% (preferably at least about 95%) of the diluent is removed, and rewetting the dried film. The membrane may then be sterilized in an autoclave. The membrane is preferably less than 6 mils thick, but of sufficient thickness to be used unsupported. The membrane may take the form of a thin sheet, or of a hollow tubular member (with the barrier layer on the inside). Preferred hollow tubular members have an inner diameter of about 3 to 30 mils, and a wall thickness not greater than about 2.5 microns.

The dialysis operation is otherwise conventional. The liquid to be dialyzed passes along the barrier layer surface of the membrane, and dialyzable components of the liquid pass through the membrane into the solvent located on the other side of the membrane. In hemodialysis, this solvent is typically an aqueous solution of salt and glucose, of concentration selected to achieve the desired ultimate salt concentration in the blood, as well as to dissolve certain microsolutes such as urea, creatinine, and the like. Applying a pressure drop (typically, 200–300 mm.$_{Hg}$) across the path of the liquid being dialyzed will also result in ultrafiltration of some water from the blood across the membrane into the saline solution. The dialyzed liquid is collected separately from the dialysate—i.e., from the dialyzed components and solvent.

In a particular hemodialysis apparatus, a plurality of tubular membranes as described are arranged in parallel and blood is fed axially through the membranes. The dialyzable components of blood pass through the membrane walls into a saline solution in contact with the outer membrane walls.

It is believed that the surprisingly low dialytic resistance to salt of such anisotropic membranes is due in part at least to the flow of solvent through, as well as along the outside of, the porous support layer of the membrane, thereby providing a salt diffusion path length which may be substantially smaller than the total membrane thickness.

The "polysulfone" polymer of the membrane is characterized by a backbone consisting essentially of hte repeating structural unit

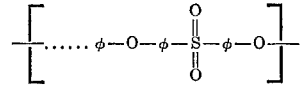

where the $\phi$ groups are phenyl, diphenyl, and like aromatic radicals. Although the word "polysulfone" has been used in a limited manner to include only those polymers containing also alkyl groups in the chain, as used herein, the term is meant to include also polysulfones containing only aryl groups in the chain, sometimes referred to as "polyarylsulfones".

One useful polysulfone is that sold under the trade name "P 1700" by Union Carbide, which has a linear chain of the general formula:

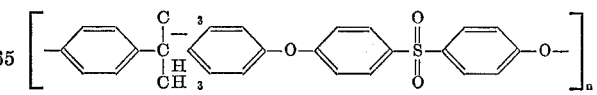

where $n$ is about 50 to 80.

Another useful polysulfone is sold under the trade name "Astrel 360 Plastic" by 3M Company, and has aryl groups, such as disphenyl and phenyl, linked by oxygen and sulfone groups, but contains no alkyl C—H bonds in the chain. Such "polyarylsulfone" polymers, in general, possess very good stability (chemical and heat), as well as an excellent combination of toughness and flexibility. The aforesaid "Astrel 360 Plastic" polyarylsulfone has a compression modulus (73° F.) of 340,000 p.s.i., and a flexural modulus of 395,000 p.s.i. at 73° F. and 252,000 p.s.i. at 500° F.

Useful polysulfones preferably also have an inherent viscosity between about 0.38 and 0.5 (as measured as 1% solutions in N,N'-dimethylformamide (DMF) at 25° C.).

Other objects, features and advantages will be apparent to one skilled in the art from the following description of preferred embodiments of the invention, the non-limiting examples thereof, and the attached drawings, in which.

Figure 1:
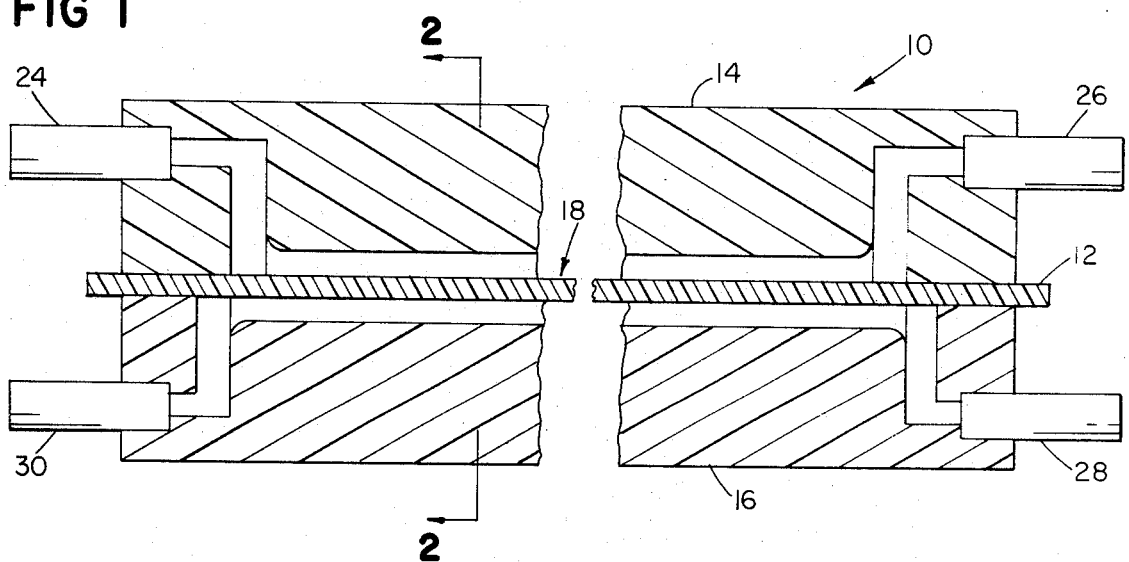
FIG. 1 is a sectional, schematic view of a hemodialysis apparatus embodying the present invention.
Figure 2:
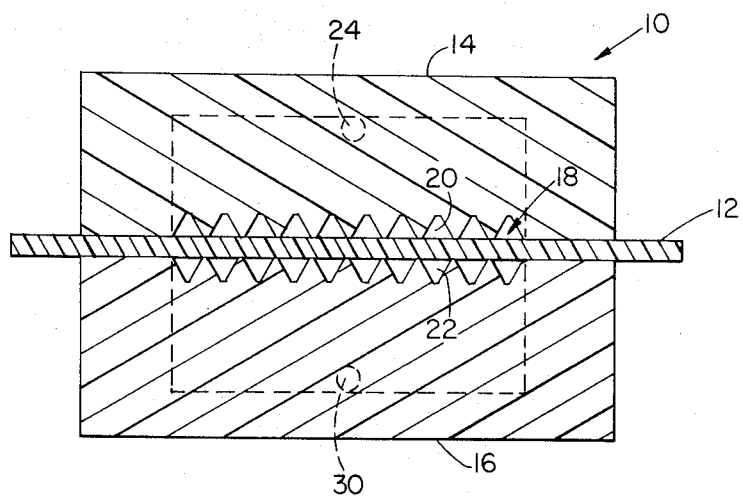
FIG. 2 is a sectional schematic view of the apparatus of FIG. 1, taken along the line 2—2.

In FIGS. 1 and 2, the simplified hemodialysis apparatus 10 shown therein has an anisotropic polysulfone membrane 12, formed as herein described, mounted between two grooved plates 14, 16, with the barrier layer surface 18 of membrane 12 facing plate 14. Membrane 12 defines, with plate 14, a plurality of thin liquid flow channels 20, and with plate 16 a plurality of thin liquid flow channels 22. An inlet 24 and an outlet 26 in plate 14 communicate with the inlet and outlet ends, respectively of flow channels 20, and an inlet 28 and an outlet 30 in plate 16 communicate with the inlet and outlet ends, respectively of flow channels 22. The liquid to be dialyzed, such as blood, enters inlet 24 and flows through channels 20 along the barrier surface 18 of membrane 12, whereas a solvent such as water enters inlet 28 and flows through channels 22 along the other side of membrane 12. Dialyzable components such as salt pass from the liquid in channels 20 through the membrane into the solvent in channels 22.

Anisotropic membranes made from polysulfones and other polymers are described and claimed in the assignee's copending U.S. patent application, Ser. No. 755,320, filed Aug. 26, 1968, now Patent No. 3,615,024. Such membranes consist of a thin barrier layer (typically, about 0.1 to 5 microns thick) having a plurality of pores from 1 to 1000 millimicrons in diameter, and a support layer of sufficiently open porous structure that it provides no significant increase in overall resistance to hydraulic flow through the membrane. The support layer and barrier layer are integral with one another and form a continuous uninterrupted polymer phase. These membranes are formed by dissolving the membrane-forming polymer in a suitable organic solvent, casting a film of this solution, preferentially contacting one side of the film with a diluent characterized by a high degree of miscibility with the organic solvent and a sufficiently low degree of compatibility with the casting solution to effect rapid precipitation of the polymer, and maintaining the diluent in contact with the membrane until substantially all solvent has been replaced with diluent. These membranes are used for ultrafiltration or "reverse osmosis" separatory processes, and have an ultrafiltration flux of greater than $10^{-3}$ ml./(cm.$^2$ x min. x mm.$_{Hg}$), far in excess of that useful in hemodialysis (although having a useful, low dialytic resistance to salt).

However, it has surprisingly been found that if one makes a polysulfone membrane in accordance with the process set forth in the aforesaid pending patent application Ser. No. 755,320, and thereafter removes at least 90% of the diluent from the membrane and rewets the membrane, the ultrafiltration flux decreases to less than 3 x $10^{-5}$ ml./(cm.$^2$ x min. x mm.$_{Hg}$) yet is still above about 1 x $10^{-6}$ ml./(cm.$^2$ x min. x mm.$_{Hg}$), without any substantial increase in dialytic resistance to salt. Hence, the dialysis characteristics of the membrane have been unexpectedly improved. This improvement is particularly unexpected in view of the entirely different properties required for ultrafiltration membranes (pore size determinative of properties) and dialysis membranes (porosity or number of pores determinative of properties). Yet the membrane still has a usefully low ultrafiltration flux for the low but actual water flux desired in certain hemodialysis operations. Moreover, unlike cellophane, the dried polysulfone and polyarysulfone membranes of the present invention can be sterilized in an autoclave without any loss in useful dialysis properties.

For making such membranes, the polymer solution should contain about 5 to 20 parts of polymer by weight. Some of the common useful organic solvents for polysulfones and polyarylsulfones include dimethylsulfoxide (DMSO, dimethylacetamide, N, N'-dimethylformamide (DMF), DMSO-acetone mixtures, N-methyl pyrrolidone, tetrahydrothiophene, formamide, mixtures of the above, and the like. Additives to the polymer solution, although not required, may include up to 10% or 15% of an inorganic salt additive such as zinc chloride.

The polymer is conveniently dissolved at temperatures of about 60-80° C., unless higher temperatures are required by the solubility of the polymer in the solvent chosen.

A film of the resulting solution is drawn with a Gardner drawdown bar onto a glass plate. The perimeter of the plate is taped and the edges of the drawn film extend over the tape. The solution permeates the tape slightly anchoring the film thereto, thereby providing means for avoiding liquid seeping under the film during the subsequent washing, or precipitation, step.

The film is allowed to stand for a minute to smooth out any irregularities introduced during drawdown. Then the film is immersed in water at 25° C. for a period of 15 minutes, after which a membrane is removed from the glass plate and cut into a suitable desired shape.

The membrane is then dried until at least 90% of the water (preferably about 95% or more) has been removed. Upon rewetting, it is suitable for dialysis.

EXAMPLE 1

A casting solution was made up of 74 gms. of a polysulfone polymer sold under the trade name "Astrel 360 Plastic" by 3M Company, and 30 gms. of zinc chloride in 296 gms. of N,N'-dimethylformamide (DMF). The zinc chloride was first dissolved in the DMF and the resultant cloudy solution cleared by adding 8 drops of concentrated hydrochloric acid. The polymer was then dissolved in this mixture. A film of this solution was cast in a wet thickness of about 7 mils with a Gardner drawdown bar as described. The film was immersed in water at 25° C. for 15 minutes, leaving a membrane 5.5 mils in thickness. The dialytic resistance of this membrane to sodium chloride (in a 1% by weight water solution) was 25.3 min./cm. determined by the procedure described by Babb et al., "The Determination of Membrane Permeabilites and Solute Diffusivities with Application to Hemodialysis," in Chem. Eng. Progress Symposium Series, 64, No. 84, pp. 59–68 (1968). It also had an ultrafiltration flux greater than $10^{-3}$ ml./cm.$^2$ x min. x mm$_{Hg}$), determined at 10 p.s.i. in a five minute test in an Amicon Model 75 Ultrafiltration Cell.

The membrane was dried at ambient conditions (atmospheric pressure, room temperature—about 25° C.) for 16 hours to remove about 95% or more of the water. The dialytic resistance, determined as above, was found to be 35.5 min./cm. and the ultrafiltration flux to be 2.5×$10^{-5}$ ml./cm.² x min. x mm$_{Hg}$). The membrane was then autoclaved for 28 minutes at 111° C. and cooled, and there was found to be no change in either dialytic resistance or ultrafiltration flux.

For comparison purposes, the dialytic resistance and ultrafiltration flux of a cellophane membrane (Visking Dialysis Grade Tubing, D.W.T. 1.6 mils) determined in identical manner to the above, were found to be 37 min./cm. and $1.2 \times 10^{-6}$ ml./(cm.² x min. x mm.$_{Hg}$), respectively.

Figure 3:
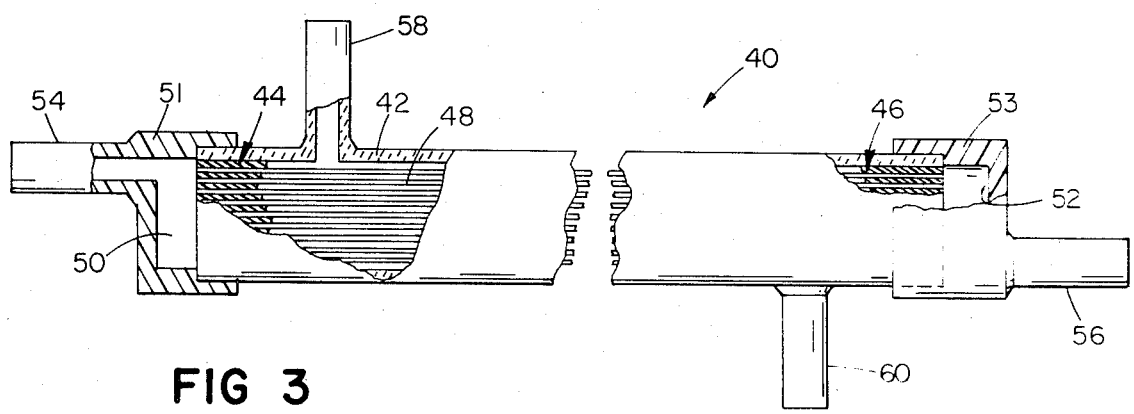
FIG. 3 is a perspective view, partially broken away, of another hemodialysis apparatus also embodying the present invention.

In FIG. 3, the simplified hemodialysis apparatus 40 includes a 10" x ¾" x ⅞" polycarbonate housing 42, in which are contained two headers 44, 46, each formed of an appropriate curable potting compound. A plurality of anisotropic hollow tubular polysulfone membranes 48 have their ends secured in each header, and are otherwise unsupported between the headers. The ends of the fibers are exposed in header 44 to an inlet manifold 50 in end plate 51, and in header 46 to an outlet manifold 52 in end plate 53. Manifolds 50 and 52 include inlet 54 and outlet 56, respectively. Housing 42 also has a radial port 58 at one end and a radial port 60 at the other end.

The tubular membranes 48 may have an inner diameter ranging from about 3 to 30 mils and a wall thickness not greater than about 2.5 microns. The barrier layer of each membrane 48 is located on the inside surface of the membrane.

The liquid to be dialyzed enters inlet manifold 50 through inlet 54, flows into the interior of the hollow tubular membranes, and axially through the membranes. A solvent for the dialyzable components of this liquid flows, in either direction, through the housing 42 between the ports 58 and 60, sweeping the outside walls of the membranes. Dialyzable components pass from the dialyzable liquid through the membrane walls into the solvent flowing through housing 42.

Figure 4:
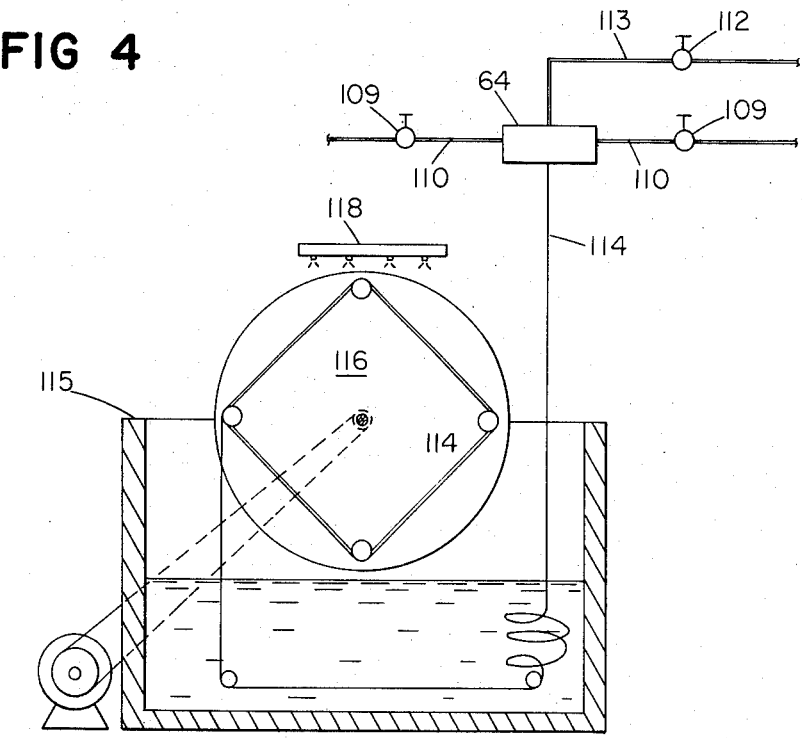
FIG. 4 is a schematic view illustrating making tubular membranes useful in the apparatus of FIG. 3 and similar hemodialyzers; and, FIG. 5 is a sectional view of a membrane-forming nozzle useful in the process illustrated in FIG. 4.
Figure 5:
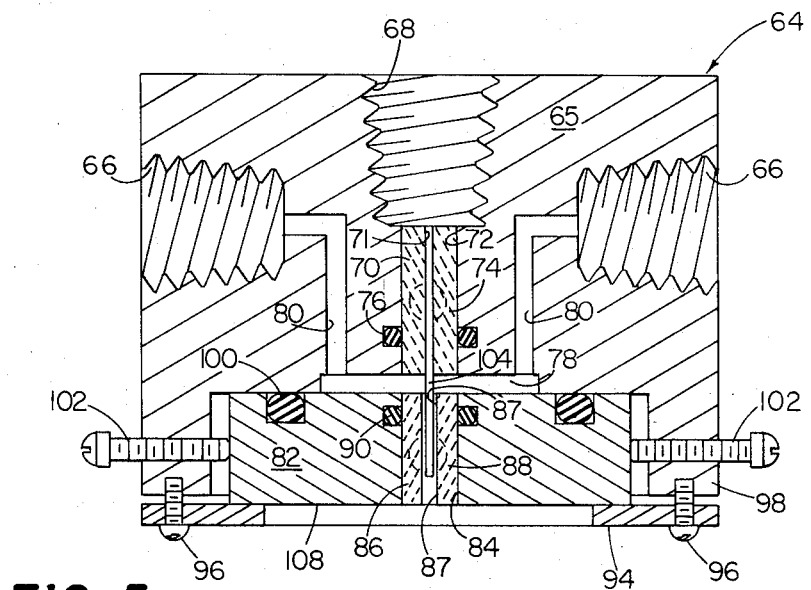

A method and apparatus for making these tubular membranes is illustrated in FIGS. 4 and 5. Forming nozzle 64 (formed of stainless steel) has an inlet portion 65 including inlets 66 for a casting solution containing the polysulfone polymer in a suitable organic solvent and an inlet 68 for the diluent (e.g., water). A first precision bored glass capillary tube 70 (outer diameter (0.1875 inch) having an inner bore 71 of diameter 0.010 inch is mounted in bore 72 of nozzle 64, and secured in place by set screws 74 and a ³⁄₁₆ x ¹⁄₁₆ inch neoprene "O-ring" 76. A cylindrical cavity 78 is formed in the bottom wall of nozzle portion 65, and suitable flow passages 80 are provided between cavity 78 and inlets 66. The outlet portion or base 82 of nozzle 64 has a bore 84 in which is mounted a second precision bored glass capillary tube 86 (outer diameter 0.1875 inch) having an inner bore 87 of diameter 0.020 inch secured in place by set screws 88 and a ³⁄₁₆ x ¹⁄₁₆ inch neoprene "O-ring" 90. The base 82 is secured to inlet portion 65 by stainless steel clamping ring 94, and fasteners 96 extending through clamping ring 94 into the lower flange 98 of inlet portion 65. The base 82 and inlet portion 65 are sealed together by a ⅞ x ⅛ inch neoprene O-ring 100, and the base 82 is centered (so that the glass tubes 70 and 86 have concentric inner bores 71, 87 respectively) by four adjusting screws 102, 90° apart and each arranged on a center line 45° from the center line of inlets 66. A drawn glass capillary 104 having an outer diameter of 0.009 inch is friction-mounted in bore 71, and is thereby suspended in bore 87. Capilliary 104 terminates within bore 87 about 0.1 inch from the lower edge 108 of base 82.

In making a tubular membrane, the casting solution is introduced through inlet valves 109, inlet lines 110, and nozzle inlet 66 into cavity 78, and diluent through valve 112, inlet line 113, and nozzle inlet 68 into capillary 104. Casting solution then flows through the annular space (about 0.005 inch wide) between bore 87 and the outer wall of capillary 104, and contacts the water stream flowing out of the end of capillary 104. The extruded continuous holow membrane or fiber 114 is then passed into a water bath in tank 115, onto rotating collecting reel 116, where a water spray is applied from sprayer 118. After the required amount of fiber has been collected, the water level in tank 115 can be raised and the collecting reel rotated for further washing of the fibers. The fibers are then dried, cut to the desired lengths, and mounted for hemodialysis, as described below.

EXAMPLE 2

The casting solution of Example 1 was introduced into nozzle 64 through inlets 66 and water through inlet 68. The ratio of water to casting solution flow rates (by volume) was 1.6 to 1.0. The extruded hollow membrane or fiber was collected and washed on the reel 112 as shown and described with reference to FIGS. 4 and 5. After washing for 16 hours the fibers were dried at 100° C. in vacuum for two hours, and cut into 12 inch lengths. A 1000-fiber bundle was then placed in the polycarbonate housing 42 shown in FIG. 3. The ends of the fibers were pinched to close them and one end of the bundle was placed in a liquid potting compound with the following composition:

Dow-Corning 382 Medical Grade Silastic—50% by weight
Dow-Corning 360 Medical Fluid—50% by weight
Dow-Corning Catalyst for 382 Silastic—0.15% by weight.

The curing of this potting compound took approximately 2 hours at room temperature. The other end of the fibers was then identically potted. Each end of the fibers was then cut off with a sharp knife flush with the end of the polycarbonate tube.

The dialytic resistance of the unit to sodium chloride was measured by the aforesaid Babb procedure by passing a 1% aqueous solution axially into the fibers while sweeping the outer surfaces of the fibers with water. The dialytic resistance was found to be 31.8 min./cm. The ultrafiltration flux, determined by applying an inlet pressure of 10 p.s.i., and an outlet pressure of 0 p.s.i. (thus an average pressure of 5 p.s.i.), and measuring the average amount of water passing through per unit time, was found to be $2.5 \times 10^{-5}$ ml./(cm.² x min. x mm.$_{Hg}$). The unit was autoclaved at 111° C. for 28 minutes, and cooled, and there was found to be no change in either dialytic resistance or water flux.

For comparison, another unit was prepared as above, but without drying the fibers. This was found to have an ultrafiltration flux greater than $10^{-3}$ ml./(cm.² x min. x mm.$_{Hg}$) and a dialytic resistance to sodium chloride of 19.9 min./cm.

EXAMPLE 3

A casting solution was made up of 2200 parts by weight of the "Astrel 360 Plastic" polysulfone polymer, 400 parts by weight of formamide, and 10,300 parts by weight of N-methyl pyrrolidone; this casting solution was formed into hollow film membranes by the procedure of Example 2. When disposed as a bundle in a unit identical to that of FIG. 2, and dried, these fibers would have a dialytic resistanec to sodium chloride less than about 50 min./cm. and an ultrafiltration flux between about $1 \times 10^{-6}$ and $3 \times 10^{-5}$ ml./cm.² x min. x mm.$_{Hg}$).

Other embodiments will be apparent to those skilled in the art and are within the following claims.

What is claimed is:
1. Dialysis apparatus comprising:
   an anisotropic microporous polysulfone membrane having a barrier layer at a surface thereof and a more porous support layer integral with said barrier layer, said barrier layer and support layer being a continuous uninterrupted polymer phase, and said membrane having a dialytic resistance to sodium chloride less than about 50 min./cm. and an ultrafiltration flux between about $3 \times 10^{-5}$ ml./(cm.² x min. x $mm._{Hg}$) and $1\times10^{-6}$ ml./($cm.^2$ x min. x $mm._{Hg}$), means for contacting said barrier layer surface of said membrane with a dialyzable liquid to permit passage of dialyzable components through said membrane, and means for contacting the opposite surface of said membrane with a solvent for the dialyzable components.

2. The apparatus of claim 1 wherein said membrane is formed by:

forming a film comprising said polymer dissolved in an organic solvent, preferentially contacting one side of said film with a diluent characterized by a high degree of compatibility with said organic solvent and a sufficiently low degree of compatibility with said polymer to effect precipitation of said polymer therefrom immediately on contact of said polymer and said diluent, maintaining said diluent in contact with said film until substantially all said solvent has been replaced with said diluent, drying said film until at least about 90% of said diluent is removed, and rewetting said dried film.

3. The apparatus of claim 2 wherein said membrane has had at least about 95% of said diluent removed.

4. The apparatus of claim 1 wherein said membrane has a thickness of less than about 6 mils.

5. The apparatus of claim 1 wherein said membrane is in the form of a thin sheet.

6. The apparatus of claim 1 wherein said membrane is in the form of a hollow tubular member, and said barrier layer is on the inside of said membrane.

7. The apparatus of claim 6 wherein said tubular member has an inner diameter of about 3 to 30 mils.

8. The apparatus of claim 6 including a plurality of said tubular membranes, arranged in parallel, and said apparatus including means for directing said dialyzable liquid along a flow path axially through said tubular membranes, to contact said liquid with said barrier layer surface, and means directing said solvent along the outer surfaces of said tubular membranes.

9. The apparatus of claim 6 wherein said membranes have a wall thickness not greater than about 2.5 mils.

10. The apparatus of claim 1 wherein said dialyzable fluid is blood.

11. A dialysis process comprising providing an anisotropic microporous polysulfone membrane having a barrier layer at a surface thereof and a more porous support layer integral with said barrier layer, said barrier layer and support layer being a continuous uninterrupted polymer phase, and said membrane having a dialytic resistance to salt less than about 50 min./cm. and an ultrafiltration flux between about $3\times10^{-5}$ ml./($cm.^2$ x min. x $mm._{Hg}$) and $1\times10^{-6}$ ml./($cm.^2$ x min. x $mm._{Hg}$), contacting the dialyzable liquid with the said barrier layer surface of said membrane, and contacting the opposite surface of the membrane with a solvent for the dialyzable components of said dialyzable liquid.

12. The method of claim 11 including the previous steps of forming said membrane by:

forming a film comprising said polymer dissolved in an organic solvent, preferentially contacting one side of said film with a diluent characterized by a high degree of compatibility with said organic solvent and a sufficiently low degree of compatibility with said polymer to effect precipitation of said polymer therefrom immediately on contact of said polymer and said diluent, maintaining said diluent in contact with said film until substantially all said solvent has been replaced with said diluent, drying said film until at least about 90% of said diluent is removed, and rewetting said dried film.

13. The method of claim 12 wherein at least about 95% of said diluent is removed.

14. The method of claim 12 wherein said diluent is water.

15. The method of claim 12 including the step of autoclaving said film after drying.

16. The method of claim 11 wherein said membrane has a thickness of less than about 6 mils.

17. The method of claim 11 wherein said membrane is in the form of a thin sheet.

18. The method of claim 11 wherein said membrane is in the form of a hollow tubular member, and said barrier layer is on the inside of said membrane.

19. The method of claim 18 wherein a plurality of said membranes are arranged in parallel, said dialyzable liquid flows axially through said membranes, and said solvent flows on the outer side of said membranes.

20. The method of claim 11 wherein said dialyzable liquid is blood.

References Cited

UNITED STATES PATENTS 3,567,666   3/1971   Berger _____ 210—503 X

FRANK A. SPEAR, Jr., Primary Examiner

U.S. Cl. X.R.

210—321, 500; 264—41